United States Patent
Oakes

[11] 3,798,909
[45] Mar. 26, 1974

[54] POWER GENERATING SYSTEM
[75] Inventor: Eric J. Oakes, San Diego, Calif.
[73] Assignee: Gulf General Atomic Incorporated, San Diego, Calif.
[22] Filed: Apr. 27, 1970
[21] Appl. No.: 31,964

[52] U.S. Cl. .......................... 60/73, 122/32, 122/34, 165/141, 165/155
[51] Int. Cl. ............................................. F01k 19/00
[58] Field of Search ........ 122/32, 34, 483; 165/141, 165/155; 60/92, 93, 59 T, 73, 108

[56] References Cited
UNITED STATES PATENTS

| | | | |
|---|---|---|---|
| 2,181,602 | 11/1939 | Keeran | 122/32 X |
| 2,372,079 | 3/1945 | Gunter | 165/155 X |
| 3,254,633 | 6/1966 | Ammon et al. | 122/32 |
| 3,277,651 | 10/1966 | Augsburger | 60/73 |
| 3,279,439 | 10/1966 | Ammon | 122/34 |

Primary Examiner—Martin P. Schwadron
Assistant Examiner—Allen M. Ostrager
Attorney, Agent, or Firm—Fitch, Even, Tabin & Luedeka

[57] ABSTRACT

A power generating system incorporating a vapor generator of the so-called uphill boiling type is described having an annular arrangement of heat exchanger tubes and a central duct for passing primary fluid to heat the vapor from a position below the vapor generator to a position above the vapor generator from whence it passes downwardly over the tubes. An additional heat exchange section is located within the central duct and has tubes arranged to extend generally parallel with the direction of flow of the primary fluid through such duct. The further heat exchange section is operated as a reheater or a resuperheater.

7 Claims, 1 Drawing Figure

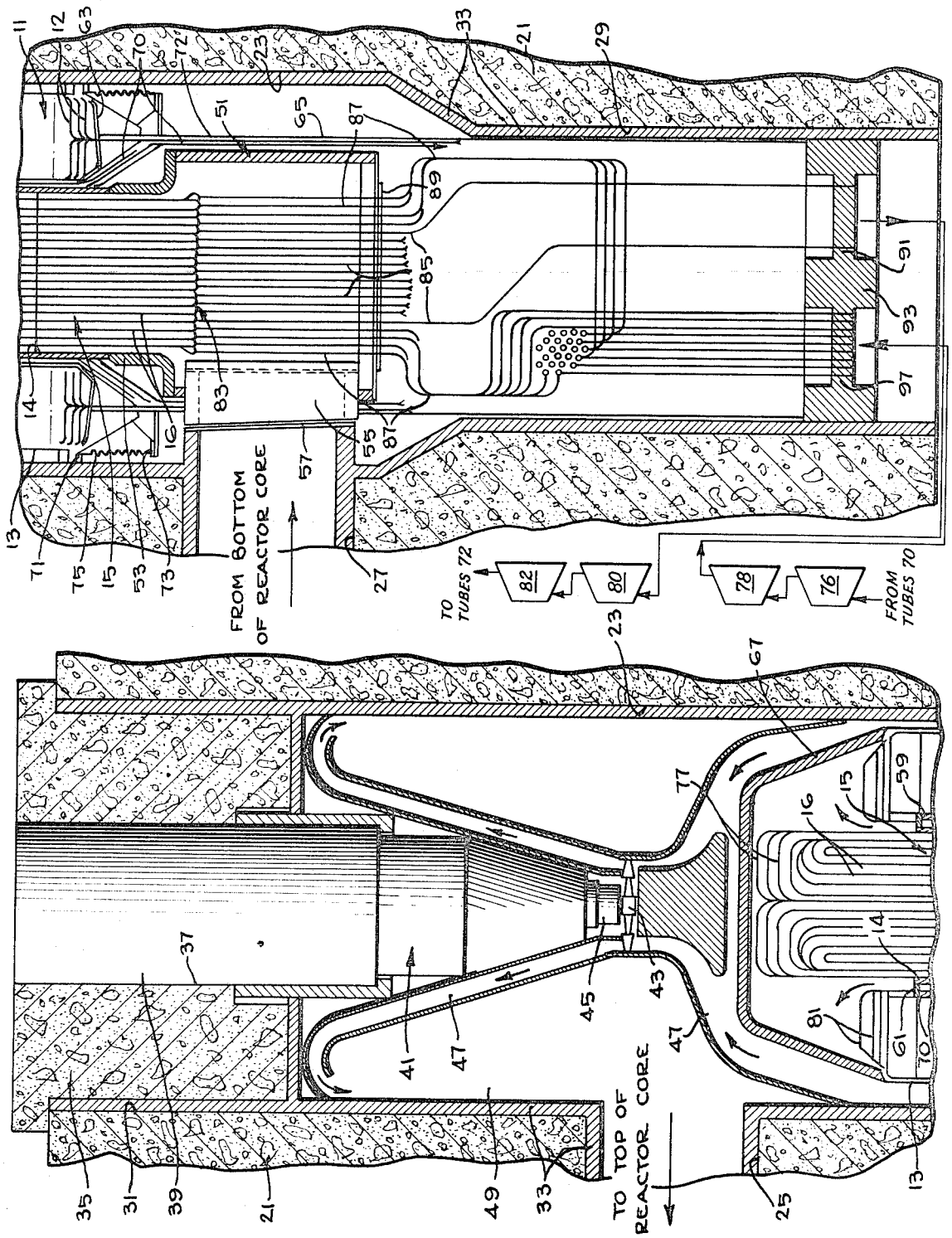

POWER GENERATING SYSTEM

This invention relates to power generating systems and, more particularly, to a power generating systems having a vapor generator of the so-called uphill boiling type and which incorporates a reheater or resuperheater. The system of the invention is particularly suited to use with a nuclear reactor but is not limited thereto.

Nuclear power reactor systems are known wherein the entire primary cooling system, including the main coolant ducting, and the vapor generators and coolant circulators, are enclosed with the core in a single prestressed concrete reactor vessel. The fact that external main primary coolant ducts are eliminated by enclosing the entire primary portion of the system in the reactor vessel avoids the possibility of a sudden loss of coolant. Where the reactor vessel is constructed of prestressed concrete, the need for additional elaborate biological shielding for enclosing the steam generators and main primary coolant ducting is eliminated, since the reactor vessel itself performs this function.

In certain types of nuclear power reactors, the particular design requirements of the overall system may make it desirable that the flow of the core coolant be directed downwardly over the reactor core elements. By doing so, the control rods may be located at the cool end of the core and gravity may be utilized to carry the control rods into the core. Moreover, the core support structure is in compression at the hot end of the core, thus avoiding a dome at the hot end and having the elements hang in tension, as is the case in many cores of the upflow coolant design. Finally, vibrational stability in the core in a downflow situation is improved, particularly with regard to the fuel elements themselves.

The so-called uphill or upflow boiling type of vapor generator provides certain advantages over other types of vapor generators, particularly where the vapor utilized is steam. More specifically, uphill boiling designs typically have greater dynamic and static stability than downflow designs. Moreover, upflow designs are adaptable to methods of minimizing transient stresses for reactor scram by programing steam flow to suitably low values and thus giving a very gradual reduction in steam temperature. An uphill boiling vapor generator may readily be designed such that it requires no orificing to avoid the inception of oscillations. In an uphill or upflow boiling vapor generator, the primary fluid which transfers heat to the working fluid within the heat exchanger tubes of the vapor generator is preferably directed downwardly over the heat exchanger tubes in a direction opposite to the ascending flow of the working fluid therein. In this way, the working fluid moves from a lower temperature region to a higher temperature region for greater thermodynamic efficiency.

When utilizing an uphill boiling vapor generator in a nuclear reactor system incorporating a downflow of coolant over the core, some problems may arise in connection with directing the primary fluid to the required locations. It is possible to place the vapor generators below the reactor core and merely continue the downflow of coolant or primary fluid beyond the reactor core and downwardly through the vapor generator. This, however, may necessitate a rather large space below the reactor core, particularly where a relatively large amount of power is to be produced, and may therefore be inconvenient or even impractical. For this reason, a more convenient design is to provide a plurality of vapor generators or modules totaling the desired vapor capacity of the reactor system in an annular arrangement surrounding the reactor core and at the same level, approximately, as the reactor core.

In such an arrangement, it is necessary to make provision within the reactor vessel for conducting the primary fluid or core coolant to a position above each of the vapor generators in order that it may pass downwardly therethrough. One particularly advantageous way of accomplishing this is to provide a vapor generator having a relatively large diameter central duct that directs the hot primary fluid or core coolant from the region below the vapor generator to the region at the top thereof. From the latter position, the primary fluid may then be directed downwardly over the heat exchange tubes in the vapor generator. Such a vapor generator construction results in a substantial amount of unused space or volume within the reactor vessel because of the large central duct needed to conduct coolant from below the vapor generator to the top thereof before it passes over the heat exchange tubes therein.

It is an object of the present invention to provide an improved power generating system.

Another object of the invention is to provide a power generating system having a vapor generator of the so-called uphill boiling type for use in situations where primary fluid must be passed upwardly from below the level of the vapor generator to above before passing downwardly therethrough.

A further object of the invention is to provide a power generating system having a vapor generator incorporating a reheater or resuperheater section and which is compact in size.

Other objects of the invention will become apparent to those skilled in the art from the following description, taken in connection with the accompanying drawing wherein the sole FIGURE is a full section view, with parts broken out and with the upper and lower portions placed side by side, of a preferred form of the vapor generator of the invention in combination with a turbine system shown schematically.

Very generally, the vapor generator of the invention comprises an outer heat exchange section 11 of annular cross section arranged about a substantially vertical axis and including a plurality of first tubes 12. The working fluid to be vaporized is passed into and through the first tubes by suitable connections in an ascending flow. A first duct 13 of annular cross section is provided for directing a primary heat transfer fluid downwardly over the first tubes to heat the working fluid. A second duct 14 is positioned centrally of the first duct and the outer heat exchange section for directing the primary heating fluid upwardly to the upper end of the first duct. An inner heat exchange section 15 is located within the second duct and includes a plurality of second tubes 16. The second tubes are arranged to extend generally parallel with the direction of flow of the primary fluid through the second duct. Suitable connections are provided for re-cycling the vapor through the second tubes after expansion in a stage of the turbine system with which the vapor generator is used.

Referring now more particularly to the drawing, the vapor generator disclosed therein is for producing steam in a high temperature gas cooled reactor wherein the primary coolant is helium. The reactor core, not shown, is enclosed within a suitable cavity, not shown, in a prestressed concrete reactor vessel 21. The vapor generator of the invention is enclosed within another cavity 23 within the reactor vessel 21. The cavity 23 is separate from the cavity in which the reactor core is positioned, and is connected to the core cavity by an upper duct 25. The duct 25 extends horizontally from the upper end of the cavity 23 to the upper end of the core cavity. A lower duct 27 extends horizontally from the lower end of the cavity 23 to the lower end of the core cavity. The cavity 23 may be only one of several similar cavities distributed circumferentially around the core cavity for containing other vapor generators of the type described herein. Such other cavities may be connected to the core cavity by ducts similar to the ducts 25 and 27.

A penetration 29 is provided in the reactor vessel 21 communicating with the cavity 23 at the lower end thereof, and a penetration 31 is provided in the reactor vessel communicating with the upper end of the cavity 23. During normal operation of the reactor system, the penetrations 29 and 31 are closed as explained in detail below. A liner 33 of a suitable material, such as stainless steel, is provided throughout the cavity 23, the ducts 25 and 27, and the penetrations 29 and 31.

The upper end of the penetration 31 is closed by a concrete plug 35. The central portion of the plug 35 is provided with a penetration 37 through which extends the body 39 of a helium circulator 41. The circulator 41 contains suitable means within the body 39 for rotating an impeller 43 mounted at the lower end of a drive shaft 45. An annular duct is formed to collect gas returning after flowing through the vapor generator, as will be described, and to guide it to the impeller 43. The rotating impeller compresses the gas, driving it upwardly through the annular duct 47 and into the region 49 above the vapor generator and below the plug 35. The gas in this region, which is at very high pressure, then flows through the duct 25 to the top of the reactor core, not shown. From there, it moves downwardly over the reactor core and its temperature is substantially increased by the heat of the nuclear reaction in the core. The gas is then returned through the duct 27 to the region below the vapor generator, as will be explained.

The lower end of the vapor generator includes a housing 51 provided on its upper wall with an integral cylindrical orifice flange 53. A further cylindrical orifice flange 55 is provided in the cylindrical side wall of the housing 51 adjacent to the duct 27. An annular seal 57 is provided between the flange 55 and the lining of the duct 27. The duct 14 is supported on the flange 53 and extends vertically upward within the cavity 23. A cylindrical wall 59 surrounds the duct 14 coaxial therewith and is sealed to the duct 14 at the upper end thereof by an annular seal 61. The lower end of the cylindrical wall 59 is provided with an outwardly extending dished flange 63. A cylindrical shroud 65 depends downwardly from about the center of the flange 63 passing down partly into the penetration 29. A suitable opening is provided in the wall of the shroud 65 for accommodating the flange 55.

A cup-shaped roof 67 is provided above the vapor generator and is supported within the cavity 23 by suitable means, not shown. The duct 13, in the form of a cylindrical shroud, is positioned coaxial with the cylinder 59 and spaced from the liner 33 of the cavity 23.

The duct 13 depends downwardly from the rim of the cup-shaped roof 67 and terminates just above the outer edge of the flange 63. This leaves an annular space communicating from the region between the cylinder 59 and the duct 13 to the region between the duct 13 and the liner 33 of the cavity 23. An annular containment structure comprised of a pair of annular seals 71 and 73 connected by a bellows 75 provides a seal towards the lower end of the vapor generator.

As previously explained, an upflow or uphill boiling steam generator provides certain advantages over other types of steam generators. As also explained previously, certain advantages are attainable from providing a downflow of coolant gas over a reactor core. Where both such designs are used and the vapor generators are distributed around the core at about the same level as the core itself, it is necessary to pass the core coolant gas or primary fluid from the level beneath the vapor generators to the level above the vapor generators.

To this end, in the illustrated embodiment, the central duct 14 is utilized. Coolant gas passing toward the steam generator through the duct 27 is collected within the housing 51 and then passes upwardly through the duct 14 to the region enclosed by the cup-shaped roof 67. The coolant gas, which is of course at a very high temperature due to heating by passage through the reactor core, is then passed downwardly through the duct 13 in the annular region between it and the cylinder 59. This region contains the main portion or outer annular heat exchange section 11 of the steam generator. The section 11 may consist of an economizer, an evaporator, and a super heater, and is preferably comprised of helically wound tubes providing an ascending flow. Operation of such a vapor generator section is well known to those skilled in the art and will not be discussed in detail herein. Lead out tubes 70 pass from the superheater of the vapor generator through the seal 61 down through the annular space between the duct 14 and the cylinder 59, through the annular space between the shroud 65 and the housing 51, and out of the reactor vessel 21 through suitable sealed openings, not shown. Lead in tubes 72 pass from outside the reactor vessel through suitable sealed openings, not shown, up through the space between the shroud 65 and the housing 51, and through the flange 63.

After passing downwardly through the duct 13, the coolant gas is passed outwardly through the annular space between the lower end of the duct 13 and the outer edge of the flange 63. In the annular space between the duct 13 and the liner 33 of the cavity 23, the gas circulates upwardly and is collected in the duct 47 of the helium circulator 41. The gas is then repressurized as explained previously and returned to the region above the reactor core through the duct 25.

For optimum efficiency, a reheater is often used in steam generating systems. The reheater serves to raise the temperature of the steam after it has been expanded in one or more turbine stages 76 and 78. After the reheater, the steam is then circulated and expanded once again in one or more turbine stages 80 and 82. A superheater may be used rather than a reheater, depending on the temperature desired in the steam.

In the vapor generator of the invention, the reheater or resuperheater stage, through which vapor is recycled after expansion in one or more stages of the turbine system, is positioned within the duct 14. The heat exchange section 15 includes the plurality of tubes 16 which are arranged to stand generally parallel with the direction of flow of the primary coolant or primary heating fluid through the duct 14. Preferably, the tubes are arranged on a triangular pitch for maximum efficiency. In the illustrated embodiment, the tubes 16 are the shape of an elongated inverted U, the connecting sections 77 being positioned towards the top of the cup-shaped roof 67 and substantially above the uppermost level of the tubes in the outer heat exchange section 11, particularly the superheater tubes. The upper level of these tubes is indicated by the line 79 although the lead-out tubes 81 for the superheater are positioned slightly above this level. By positioning the bends on connecting sections of each of the U shaped tubes 16 substantially above the level of the tubes in the main or outer heat exchange section 11, a prohibitive pressure drop in the primary coolant is avoided, since the coolant may pass outwardly through the still vertical portions of the tubes 16 and into the region below the roof 67.

The presence of the reheater or the resuperheater within the duct 14 with parallel flow of primary coolant and vapor affords significant advantages. Among these are that the presence of the reheater or resuperheater damps out undesirable fluctuations in the temperature of the primary coolant before it reaches the main vapor generator heat exchange section 11. In particular, this is advantageous in the superheater section since superheater tubes are necessarily thin walled and severe temperature fluctuation can have a bad effect. Moreover, the design of the vapor generator is compact since the space within the duct is utilized. Where the inlet sides of the tubes 16 are arranged so that they are oriented radially outwardly of the outlet sides, and wherein all of the tubes are arranged on a triangular pitch, thermal movements of the tubes are equally distributed radially. If greater deviance in uniformity of thermal expansion may be tolerated, a random mixture of tubes may also be feasible. In such case a greater damping effect on thermal radiation within the primary coolant flow may be achievable. Moreover, although the inverted U shaped tube design is described and illustrated, a straight through tube arrangement may also be feasible under some circumstances.

It will be noted that, as the primary coolant enters the housing 51, it flows across the reheater tubes before it starts to flow upwardly through the duct 14. To avoid an excessive pressure drop in this region, the illustrated embodiment employs an arrangement of subheaders just above the level of the duct 27. This subheadering arrangement, indicated generally at the region 83, may employ a ratio of 2 to 1 between the reheater tubes and the outlet and inlet lead tubes 85 and 87 respectively, for satisfactory results.

The outlet lead tubes 85 emerge in a bundle of circular outline through the lower wall of the housing 51 in a tube sheet 89. The tube bundle then is passed through a further tube sheet 91 located in a steel closure plate 93 to a position outside the reactor vessel 21. The closure plate 93 serves to close the lower penetration 29.

The inlet lead tubes 87 also pass through the tube sheet 89 in the lower wall of the housing 51 but are arranged in a series of bundles located around the central bundle of outlet lead tubes 85. The bundles of cold reheat inlet lead tubes 87 are subheadered in the region 83. They are then passed out through the tube sheet 97 in the primary closure. Final headering of the inlet and outlet lead tubes then takes place outside of the main reactor vessel 21.

By placing the cold reheat inlet leads in groups surrounding the hotter outlet leads 85, hot gas entering the cavity 23 through the duct 27 will first cross the colder inlet leads before reaching the hot reheat outlet leads. This tends to reduce the severity of any hot gas streaks on the more critical hot reheat outlet leads. That is, any extreme fluctuations in temperature in the inlet gas will be damped out by first passing over the colder reheat inlet leads before reaching the hotter outlet leads. Also, the fact that the hot reheat leads are already in a circular pattern as they emerge from the housing 51 makes it necessary to only reorient the inlet leads into the circular pattern required for the tube sheet. This simplifies construction below the steam generator.

It may therefore be seen that the invention provides an improved vapor generator which incorporates a reheater or a resuperheater therein. The vapor generator of the invention has particular advantage for use as a modular steam generator in a nuclear reactor wherein the reactor core, main coolant ducting, and steam generator modules are all contained within a prestressed concrete reactor vessel. The invention provides an efficient and compact design for an uphill boiling type of steam generator which may be used with a downflow reactor core and which may be positioned substantially at the level of the reactor core.

Various modifications of the invention in addition to those shown and described herein will become apparent to those skilled in the art from the foregoing discussion, and the accompanying drawings. Such modifications are intended to fall within the scope of the appended claims.

What is claimed is:

1. A power generating system comprising, a vapor generator for removing heat from a primary fluid to produce vapor, and a turbine system having a series of expansion stages in which at least part of the vapor is recycled through the vapor generator after at least one expansion stage, said vapor generator including an outer heat exchange section of annular cross section arranged about a substantially vertical axis and including a plurality of first tubes, means for passing the fluid to be vaporized into and through said first tubes in an ascending flow, a first duct of annular cross section for directing the primary fluid downwardly over said first tubes, a second duct positioned centrally of said first duct and said outer section for directing the primary fluid upwardly to the upper end of said first duct, an inner heat exchange section located within said second duct and including a plurality of second tubes, said second tubes being arranged to extend generally parallel with the direction of flow of the primary fluid through said second duct, and means for recycling the vapor through said second tubes after expansion in said turbine system.

2. A system according to claim 1 wherein said second tubes are each of the shape of an elongated inverted U.

3. A system according to claim 2 wherein the connecting section of each U shaped tube is positioned at a substantially higher level than the uppermost level of said first tubes.

4. A system according to claim 2 including means for introducing a substantially horizontal flow of primary fluid at the bottom of said second duct, and wherein said inner heat exchanger section includes a plurality of subheaders for said second tubes positioned proximate the lower end of said second duct and above the horizontally flowing primary fluid.

5. A system according to claim 2 wherein the inlet sides of said second tubes are arranged radially outwardly of the outlet sides.

6. A system according to claim 1 wherein said inner heat exchange section comprises a reheater in the vapor cycle.

7. A system according to claim 1 wherein the inner heat exchange section comprises a resuperheater in the vapor cycle.

* * * * *